US006993152B2

(12) United States Patent
Patterson et al.

(10) Patent No.: US 6,993,152 B2
(45) Date of Patent: Jan. 31, 2006

(54) HIDING GEO-LOCATION DATA THROUGH ARRANGEMENT OF OBJECTS

(75) Inventors: Philip R. Patterson, Sherwood, OR (US); Neil E. Lofgren, White Salmon, WA (US); John Stach, Tualatin, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 509 days.

(21) Appl. No.: 10/218,021

(22) Filed: Aug. 12, 2002

(65) Prior Publication Data

US 2003/0053654 A1   Mar. 20, 2003

Related U.S. Application Data

(63) Continuation-in-part of application No. 10/074,680, filed on Feb. 11, 2002, which is a continuation-in-part of application No. 09/939,298, filed on Aug. 24, 2001, now Pat. No. 6,804,379, which is a continuation-in-part of application No. 09/127,502, filed on Jul. 31, 1998, now Pat. No. 6,345,104, which is a continuation-in-part of application No. 09/074,034, filed on May 6, 1998, now Pat. No. 6,449,377, which is a continuation-in-part of application No. 08/967,693, filed on Nov. 12, 1997, now Pat. No. 6,122,392, which is a continuation-in-part of application No. 08/649,419, filed on May 16, 1996, now Pat. No. 5,862,260, which is a continuation of application No. 08/614,521, filed on Mar. 15, 1996, now Pat. No. 5,745,604, which is a continuation of application No. 08/215,289, filed on Mar. 17, 1994, now abandoned.

(60) Provisional application No. 60/082,228, filed on Apr. 16, 1998, and provisional application No. 60/350,505, filed on Jan. 18, 2002.

(51) Int. Cl.
*H04K 1/00* (2006.01)

(52) U.S. Cl. ...................................... 382/100; 713/176

(58) Field of Classification Search ................. 382/100, 382/232, 284; 713/176; 380/287, 51, 54, 380/55; 283/72, 85, 93, 113, 901; 345/629, 345/634, 635, 637, 641
See application file for complete search history.

(56) References Cited

U.S. PATENT DOCUMENTS

| 4,084,241 A | 4/1978 | Tsumura ...................... 364/460 |
| 4,271,351 A | 6/1981 | Bloodworth ................. 235/375 |
| 4,504,910 A | 3/1985 | Araki et al. ................. 364/424 |

(Continued)

FOREIGN PATENT DOCUMENTS

| EP | 0 947 953 A2 | 10/1999 |
| EP | 0 953 938 A2 | 11/1999 |
| EP | 0 935 872 B1 | 11/2001 |

(Continued)

OTHER PUBLICATIONS

Caldelli et al., "Geometric–Invariant Robust Watermarking through Constellation Matching in the Frequency Domain," *IEEE Proc. Int. Conf. on Image Processing*, vol. 2, Sep. 2000, pp. 65–68.*

(Continued)

*Primary Examiner*—Andrew W. Johns
(74) *Attorney, Agent, or Firm*—Digimarc Corporation (57) ABSTRACT

The present invention provides steganographic-embedding techniques. In one implementation a digital watermark signal is mapped to a set of spatial positions. Physical message objects are positioned according to the set of spatial positions. The signal is provided on a physical structure such as a building or road. The signal may include geo-location information. The geo-location information identifies the location of the physical structure. In other cases the signal includes a marker or identifier. The marker or identifier provides a reference point for images depicting the physical structure.

18 Claims, 4 Drawing Sheets

U.S. PATENT DOCUMENTS

| | | | |
|---|---|---|---|
| 4,631,678 A | 12/1986 | Angermuller et al. | 364/424 |
| 5,113,445 A | 5/1992 | Wang | 380/51 |
| 5,214,757 A | 5/1993 | Mauney et al. | 395/161 |
| 5,280,537 A | 1/1994 | Sugiyama et al. | 375/1 |
| 5,329,108 A | 7/1994 | Lamoure | 235/494 |
| 5,375,058 A | 12/1994 | Bass | 364/439 |
| 5,385,371 A | 1/1995 | Izawa | 283/34 |
| 5,469,371 A | 11/1995 | Bass | 364/550 |
| 5,499,294 A | 3/1996 | Friedman | 380/10 |
| 5,502,576 A | 3/1996 | Ramsay et al. | 358/444 |
| 5,664,018 A | 9/1997 | Leighton | 380/54 |
| 5,812,962 A | 9/1998 | Kovac | 701/208 |
| 5,825,892 A | 10/1998 | Braudaway et al. | 380/51 |
| 5,861,841 A | 1/1999 | Gildea et al. | 342/357 |
| 5,889,868 A | 3/1999 | Moskowitz et al. | 380/51 |
| 5,889,898 A | 3/1999 | Koren et al. | 385/9 |
| 5,901,178 A | 5/1999 | Lee et al. | 375/240 |
| 5,919,730 A | 7/1999 | Gasper et al. | 503/201 |
| 5,958,051 A | 9/1999 | Renaud et al. | 713/200 |
| 5,964,821 A | 10/1999 | Brunts et al. | 701/201 |
| 5,990,826 A | 11/1999 | Mitchell | 342/357.06 |
| 6,005,936 A | 12/1999 | Shimizu et al. | 380/4 |
| 6,031,914 A | 2/2000 | Tewfik et al. | 380/54 |
| 6,122,403 A | 9/2000 | Rhoads | 382/233 |
| 6,130,741 A | 10/2000 | Wen et al. | 355/40 |
| 6,175,639 B1 | 1/2001 | Satoh et al. | 382/100 |
| 6,181,802 B1 | 1/2001 | Todd | 382/100 |
| 6,185,312 B1 | 2/2001 | Nakamura et al. | 382/100 |
| 6,198,832 B1 * | 3/2001 | Maes et al. | 382/100 |
| 6,205,249 B1 | 3/2001 | Moskowitz | 382/232 |
| 6,243,480 B1 | 6/2001 | Zhao et al. | 382/100 |
| 6,246,777 B1 | 6/2001 | Agarwal et al. | 382/100 |
| 6,249,226 B1 | 6/2001 | Harrison et al. | 340/572.1 |
| 6,263,438 B1 | 7/2001 | Walker et al. | 713/178 |
| 6,282,362 B1 | 8/2001 | Murphy et al. | 386/46 |
| 6,289,453 B1 | 9/2001 | Walker et al. | 713/175 |
| 6,301,360 B1 | 10/2001 | Bocionek et al. | 380/28 |
| 6,310,956 B1 | 10/2001 | Morito et al. | 380/201 |
| 6,311,214 B1 | 10/2001 | Rhoads | 709/217 |
| 6,320,829 B1 | 11/2001 | Matsumoto et al. | 369/47.12 |
| 6,324,573 B1 | 11/2001 | Rhoads | 709/217 |
| 6,332,149 B1 | 12/2001 | Warmus et al. | 707/517 |
| 6,332,193 B1 | 12/2001 | Glass et al. | 713/100 |
| 6,341,350 B1 | 1/2002 | Miyahara et al. | 713/176 |
| 6,343,138 B1 | 1/2002 | Rhoads | 382/100 |
| 6,351,439 B1 | 2/2002 | Miwa et al. | 369/47.18 |
| 6,401,206 B1 | 6/2002 | Khan et al. | 713/176 |
| 6,408,082 B1 | 6/2002 | Rhoads et al. | 382/100 |
| 6,408,331 B1 | 6/2002 | Rhoads | 709/217 |
| 6,411,725 B1 | 6/2002 | Rhoads | 382/100 |
| 6,427,020 B1 | 7/2002 | Rhoads | 382/100 |
| 6,448,979 B1 | 9/2002 | Schena et al. | 345/741 |
| 6,493,514 B1 | 12/2002 | Stocks et al. | 396/311 |
| 6,496,802 B1 | 12/2002 | van Zoest et al. | 705/14 |
| 6,498,984 B2 | 12/2002 | Agnew et al. | 701/207 |
| 6,504,571 B1 | 1/2003 | Narayanaswami et al. | 348/231.99 |
| 6,505,160 B1 | 1/2003 | Levy et al. | 704/270 |
| 6,512,835 B1 | 1/2003 | Numao et al. | 382/100 |
| 6,522,770 B1 | 2/2003 | Seder et al. | 382/100 |
| 6,532,541 B1 | 3/2003 | Chang et al. | 713/176 |
| 6,542,927 B2 | 4/2003 | Rhoads | 709/217 |
| 6,556,688 B1 | 4/2003 | Ratnakar | 382/100 |
| 6,614,914 B1 | 9/2003 | Rhoads et al. | 382/100 |
| 6,636,249 B1 | 10/2003 | Rekimoto | 345/849 |
| 6,700,994 B2 * | 3/2004 | Maes et al. | 382/100 |
| 2001/0001854 A1 | 5/2001 | Schena et al. | 705/27 |
| 2001/0019611 A1 | 9/2001 | Hilton | 380/203 |
| 2001/0022667 A1 | 9/2001 | Yoda | 358/1.14 |
| 2001/0026377 A1 | 10/2001 | Ikegami | 358/401 |
| 2001/0026616 A1 | 10/2001 | Tanaka | 380/202 |
| 2001/0026629 A1 | 10/2001 | Oki | 382/100 |
| 2001/0030759 A1 | 10/2001 | Hayashi et al | 358/1.9 |
| 2001/0031064 A1 | 10/2001 | Donescu et al. | 382/100 |
| 2001/0033674 A1 | 10/2001 | Chen et al. | 382/100 |
| 2001/0034835 A1 | 10/2001 | Smith | 713/175 |
| 2001/0039546 A1 | 11/2001 | Moore et al. | 707/10 |
| 2001/0046307 A1 | 11/2001 | Wong | 382/100 |
| 2001/0051964 A1 | 12/2001 | Warmus et al. | 707/530 |
| 2002/0001395 A1 | 1/2002 | Davis et al. | 382/100 |
| 2002/0002679 A1 | 1/2002 | Murakami et al. | 713/176 |
| 2002/0006212 A1 | 1/2002 | Rhoads et al. | 382/100 |
| 2002/0009209 A1 | 1/2002 | Inoue et al. | 382/100 |
| 2003/0032033 A1 | 2/2002 | Anglin et al. | 435/6 |
| 2002/0044690 A1 | 4/2002 | Burgess | 382/109 |
| 2002/0046178 A1 | 4/2002 | Morito et al. | 705/51 |
| 2002/0057340 A1 | 5/2002 | Fernandez et al. | 348/143 |
| 2002/0059520 A1 | 5/2002 | Murakami et al. | 713/176 |
| 2002/0065844 A1 | 5/2002 | Robinson et al. | 707/500 |
| 2002/0069370 A1 | 6/2002 | Mack | 713/201 |
| 2002/0075298 A1 | 6/2002 | Schena et al. | 345/738 |
| 2002/0080396 A1 | 6/2002 | Silverbrook et al. | 358/1.15 |
| 2002/0095586 A1 | 7/2002 | Doyle et al. | 713/186 |
| 2002/0095601 A1 | 7/2002 | Hind et al. | 713/201 |
| 2002/0106105 A1 | 8/2002 | Pelly et al. | 382/100 |
| 2002/0122564 A1 | 9/2002 | Rhoads et al. | 382/100 |
| 2002/0124171 A1 | 9/2002 | Rhoads | 713/176 |
| 2002/0124173 A1 | 9/2002 | Stone | 713/176 |
| 2002/0135600 A1 | 9/2002 | Rhoads | 345/629 |
| 2002/0136531 A1 | 9/2002 | Harradine et al. | 386/69 |
| 2002/0147910 A1 | 10/2002 | Brundage et al. | 713/176 |
| 2002/0159765 A1 | 10/2002 | Maruyama et al. | 386/95 |
| 2002/0168069 A1 | 11/2002 | Tehranchi et al. | 380/235 |
| 2002/0191810 A1 | 12/2002 | Fudge et al. | 382/100 |
| 2003/0011684 A1 | 1/2003 | Narayanaswami et al. | 348/207.99 |
| 2003/0012562 A1 | 1/2003 | Lawandy et al. | 386/126 |
| 2003/0021439 A1 * | 1/2003 | Lubin et al. | 382/100 |
| 2003/0040326 A1 | 2/2003 | Levy et al. | 455/466 |
| 2003/0048908 A1 | 3/2003 | Hamilton | 380/277 |
| 2003/0053654 A1 | 3/2003 | Patterson et al. | 382/100 |
| 2003/0063319 A1 | 4/2003 | Umeda et al. | 358/3.28 |
| 2003/0069693 A1 | 4/2003 | Snapp et al. | 701/213 |
| 2003/0074556 A1 | 4/2003 | Chapman et al. | 713/157 |
| 2003/0083098 A1 | 5/2003 | Yamazaki et al. | 455/556 |
| 2003/0090690 A1 | 5/2003 | Katayama et al. | 358/1.9 |
| 2003/0215110 A1 | 11/2003 | Rhoads et al. | 382/100 |
| 2004/0162981 A1 | 8/2004 | Wong | 713/161 |
| 2004/0201676 A1 | 10/2004 | Needham | 348/207.1 |
| 2004/0221244 A1 | 11/2004 | Baldino | 715/835 |

FOREIGN PATENT DOCUMENTS

| | | |
|---|---|---|
| EP | 1220152 A2 | 7/2002 |
| GB | 2371934 A | 8/2002 |
| JP | 2004-041144 A | 2/2000 |
| WO | WO 99/17537 A1 | 4/1999 |
| WO | WO 01/05075 A1 | 1/2001 |
| WO | WO01/24113 A1 | 4/2001 |
| WO | WO01/39121 | 5/2001 |
| WO | WO01/76253 A1 | 10/2001 |
| WO | WO02/03328 A1 | 1/2002 |
| WO | WO02/33650 A1 | 4/2002 |

OTHER PUBLICATIONS

Ding et al., "A Novel Digital Image Hiding Technology Based on Tangram and Conway's Game," *IEEE Proc. Int. Conf. on Image Processing*, vol. 1, Sep. 2000, pp. 601–604.*

Rongen et al., "Digital Image Watermarking by Salient Point Modification Practical Results," *Proc. SPIE vol. 3657: Security and Watermarking of Multimedia Contents*, Jan. 1999, pp. 273–282.*

Maes et al., "Digital Watermarking by Geometric Warping," *IEEE Proc. Int. Conf. on Image Processing*, vol. 2, Oct. 1998, pp. 424–426.*

U.S. Pat. App. No. 09/503,881 filed Feb. 14, 2000, Rhoads et al.

U.S. Pat. App. No. 09/571,422 filed May 15, 2000, Rhoads et al.

Bartlett, "Digital Watermarking, The Unseen Advantage" *Geo Informatics*, Jun. 2001, pp. 6–8.

Bender et al., "Techniques for Data Hiding," SPIE vol. 2420, Jan. 1995, pp. 164–173.

Caronni, "Assuring Ownership Rights for Digital Images," Published in the Proceedings of 'Reliable IT Systems,' VIS '95 , HH. Brüggemann and W. Gerhadt–Häckl (Ed.), Vieweg Publishing Company, Germany, 1995, Jun. 14, 1994, 10 pages.

Carp, "Seven wonders of the imaging world", *International Contact*, Oct./Nov. 2000, pp. 36/I –36/IV.

Friedman, "The Trustworthy Digital Camera: Restoring Credibility to the Photographic Image," *IEEE Transactions on Consumer Electronics*, vol. 39, No. 4, Nov. 1993, pp. 905–910.

http://web. archive.org/web20010305033241/http://www.kodak.com/country/US/en/corp/researchDevelopment/technologyFeatures/digital Watermarking.shtml, "Invisible Watermarking", archive date of Mar. 5, 2001 (4 pages, including Internet Archive Wayback Machine cover page).

Koch et al., "Digital Copyright Labeling: Providing Evidence of Misuse and Tracking Unauthorized Distribution of Copyrighted Materials," *OASIS Magazine*, Dec. 1995, 3 pages.

Manjunath, "Image Processing in the Alexandria Digital Library Project," *Proc. IEEE Int. Form on Research and Tech. Advances in Digital Libraries –ADL '98*, pp. 180–187.

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.–Dec. 1998, *IEEE Micro*vol. 18, No. 6, pp. 32–41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Zhao, "Digital Watermark Mobile Agents," Proc. of NISSC'99, Arlington, VA, Oct. 18–21, 1999, pp. 138–146.

Notice of Allowance (dated Dec. 17, 2004), Appeal Brief (dated Sep. 20, 2004) and Office Action (dated May 7, 2004) from parent patent application No. 09/800,093.

Notice of Allowance (dated Dec. 17, 2004), Appeal Brief (dated Sep. 9, 2004) and Office Action (dated May 14, 2004) from assignee's patent application No. 10/002,954.

\* cited by examiner

Message Object
Building Top

Fig. 5b

Building Top

Building

Fig. 6

HIDING GEO-LOCATION DATA THROUGH ARRANGEMENT OF OBJECTS

RELATED APPLICATION DATA

The present application is a continuation in part of U.S. patent application Ser. No. 10/074,680, filed Feb. 11, 2002. The present application is also a continuation in part of U.S. patent application Ser. No. 09/939,298, filed Aug. 24, 2001 (now U.S. Pat. No. 6,804,379), which is a continuation in part of U.S. patent application Ser. No. 09/127,502, filed Jul. 31, 1998 (now U.S. Pat. No. 6,345,104), which is a continuation-in-part of U.S. patent application Ser. No. 09/074,034, filed May 6, 1998 (now U.S. Pat. No. 6,449,377). The Ser. No. 09/127,502 application is also a continuation-in-part of U.S. patent application Ser. No. 08/967,693, filed Nov. 12, 1997 (now U.S. Pat. No. 6,122,392), which is a continuation of application Ser. No. 08/614,521, filed Mar. 15, 1996 (now U.S. Pat. No. 5,745,604), which is a continuation of application Ser. No. 08/215,289, filed Mar. 17, 1994 (now abandoned). The Ser. No. 09/127,502 application is also a continuation-in-part of application Ser. No. 08/649,419, filed May 16, 1996 (now U.S. Pat. No. 5,862,260). The Ser. No. 09/127,502 application also claims the benefit of U.S. Provisional application No. 60/082,228, filed Apr. 16, 1998. The present application also claims the benefit of assignee's U.S. Provisional Patent Application No. 60/350,505, filed Jan. 18, 2002, titled crata Hiding Through Arrangement of Objects."

The present application is also related to U.S. patent application Ser. No. 09/940,872, filed Aug. 27, 2001, and PCT Patent Application No. PCT/US 02/06858, filed Mar. 5, 2002.

Each of the above-mentioned patent documents is herein incorporated by reference.

FIELD OF THE INVENTION

The present invention relates to steganography and data hiding.

BACKGROUND AND SUMMARY OF THE INVENTION

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending U.S. patent application Ser. No. 09/503,881 and U.S. patent application Ser. No. 6,122,403, which are each herein incorporated by reference.

In U.S. patent application Ser. No. 09/127,502 we disclose the following:

Many security documents are still designed largely by hand. A designer works at a drafting table or computer workstation, and spends many hours laying-out minute (e.g. 5 mm×5 mm) excerpts of the design. To aid integration of watermark and/or calibration pattern data in this process, an accessory layout grid can be provided, identifying the watermark "bias" (e.g. −3 to +3) that is to be included in each 250 micron cell of the security document. If the accessory grid indicates that the luminance should be slightly increased in a cell (e.g. 1%), the designer can take this bias in mind when defining the composition of the cell and include a touch less ink than might otherwise be included. Similarly, if the accessory grid indicates that the luminance should be somewhat strongly increased in a cell (e.g. 5%), the designer can again bear this in mind and try to include more ink than might otherwise be included. Due to the substantial redundancy of most watermark encoding techniques, strict compliance by the designer to these guidelines is not required. Even loose compliance can result in artwork that requires little, if any, further modification to reliably convey watermark and/or calibration information.

Such "designing-in" of embedded information in security documents is facilitated by the number of arbitrary design choices made by security document designers. A few examples from U.S. banknotes include the curls in the presidents' hair, the drape of clothing, the clouds in the skies, the shrubbery in the landscaping, the bricks in the pyramid, the fill patterns in the lettering, and the great number of arbitrary guilloche patterns and other fanciful designs, etc. All include curves, folds, wrinkles, shadow effects, etc., about which the designer has wide discretion in selecting local luminance, etc. Instead of making such choices arbitrarily, the designer can make these choices deliberately so as to serve an informational—as well as an aesthetic—function.

To further aid the security document designer, data defining several different information-carrying patterns (both watermark and/or calibration pattern) can be stored on mass storage of a computer a workstation and serve as a library of design elements for future designs. The same user-interface techniques that are employed to pick colors in image-editing software (e.g. Adobe Photoshop) and fill textures in presentation programs (e.g. Microsoft PowerPoint) can similarly be used to present a palette of information patterns to a security document designer. Clicking on a visual representation of the desired pattern makes the pattern available for inclusion in a security document being designed (e.g. filling a desired area).

In the embodiment earlier-described, the calibration pattern is printed as a visible artistic element of the security document. However, the same calibration effect can be provided subliminally if desired. That is, instead of generating artwork mimicking the gray-scale pattern of the reference calibration block, the reference calibration block can itself be encoded into the security document as small changes in local luminance. In many such embodiments, the bias to localized document luminance due to the calibration pattern is simply added to the bias due to the watermark data, and encoded like the watermark data (e.g. as localized changes to the width or position of component line-art lines, as inserted ink droplets, etc.).

The present invention continues these inventive ideas. According to one aspect of the present invention, message objects are included in an image. The message objects preferably have characteristics that distinguish them from image background or other image objects. Some such distinguishing characteristics many include, color or gray-scale values, luminance values, and a contrast in comparison to other objects or to a background. The distinguishing characteristics can be subtle and need not be perceptible by a human viewer. For example, the message object may be slightly lighter than the image background or other image objects. Or the message objects may be darker than its background.

Message objects are arranged within the image to convey (or hide) information, such as a steganographic message or signal. The message is typically indistinguishable by a human viewer. However, computer software can analyze the arrangement to determine the hidden information. In one embodiment, a digital watermark signal is reduced to a set of spatial positions. The set of spatial positions sufficiently conveys the digital watermark signal. Message objects are positioned according to the set of spatial points. Non-message objects are combined with the message objects to form an image or design. The message objects include distinguishable characteristics, e.g., via color, contrast, gray-scale level or luminance, in comparison to the non-message objects. The digital watermark signal is detected by distinguishing the message objects from the non-message objects (e.g., via color or contrast differences) and analyzing the relative placement of the message objects within the image or design. Such techniques can be even used to mark physical structures like a building, road or bridge.

Additional features and advantages of the present invention will become even more apparent with reference to the following detailed description and accompanying drawings.

DETAILED DESCRIPTION

We have found that the arrangement of objects within an image can be used to convey information—which is otherwise imperceptible to a human viewer. We arrange so-called "message objects" to convey or represent a steganographic signal (e.g., a digital watermark). We define a message object broadly herein as including an information carrier, an image object, a shape, an object or collection of objects, a pixel or group of pixels, a physical object, paint or other covering, surface texture, a contrast or color/gray-scale area, etc. A set of message objects is arranged within an image or area to form a steganographic message. A few examples are provided below.

Consider a drawing illustrating a Dalmatian puppy. The puppy has a white coat complimented with black spots. An artist (or digital editor) can arrange a set of spots—an example of our message objects—so as to convey a hidden or steganographic message. More practical, however, is to align the spots according to a predetermined steganographic signal and then sculpt or design the puppy around the aligned spots.

Now consider an image or picture depicting hundreds of marbles strewn across a surface. Certain of the marbles have an offsetting color (or luminance, gray-scale level, contrast, etc.) when compared to the surface or to other marbles. We call these offset color marbles our "message marbles." The message marbles are arranged to represent (or to form) a steganographic signal. More practical, perhaps, is to initially arrange the message marbles according to a predetermined signal (e.g., a digital watermark signal, an orientation signal or various combinations of both) and then "fill-in" non-message marbles to complete the image.

Another example may be appealing to astronomers. Consider an image or graphic depicting a nighttime sky. The sky is populated with "message stars." The message stars are arranged in the nighttime sky in a predetermined manner according to a steganographic signal. The sky is further populated with non-message stars. The message stars are preferably distinguishable from the non-message stars. The distinguishing characteristics need not be visibly perceptible, and may be based on subtle differences, e.g., as measured in luminance, color levels, brightness, contrast, etc.

A steganographic decoder, analyzing a digital version (e.g., an optically captured image) of the Dalmatian puppy, marble image or populated nighttime sky, decodes the steganographic message.

While the above signal-conveying techniques rely on the arrangement of message objects in a spatial domain (e.g., in an image), message formation or detection can be based in either a spatial or transform (e.g., Fourier or frequency) domain. For example, the arrangement of the message objects in the spatial domain may have significance in a frequency domain (e.g., may correspond to a pattern of peaks, etc.). Message detection can be accordingly facilitated, e.g., as discussed in Assignee's U.S. patent application Ser. Nos. 09/940,872 and 09/503,881, each of which is herein incorporated by reference. The incorporated by reference patent documents detail many techniques for signal hiding and message detection.

(Applicant notes by way of example that since the Fourier transform is a linear operation, adjustments to pixels in a region may be made in the frequency or spatial domain. For example, a digital watermark embedder can adjust the frequency domain representation of the host signal according to the watermark definition to form a frequency domain representation of the watermarked signal region, and then take the inverse Fourier transform of the watermarked regions to produce the watermarked signal in the spatial domain. Alternatively, the embedder can compute a difference signal to effect the desired changes to the region in the frequency domain, and then compute the inverse transform of the difference signal into the spatial domain, where corresponding pixels of the difference signal and host signal region are summed. Either way, the result is a watermarked signal in the original domain of the host signal.).

Steganographic Image Construction

Figure 1:
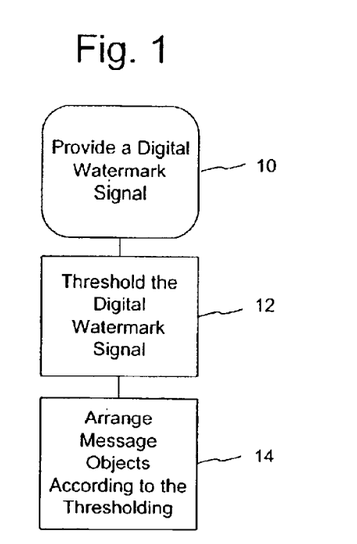
FIG. 1 is a flow diagram illustrating an image construction method according to one aspect of the present invention.
Figure 2:
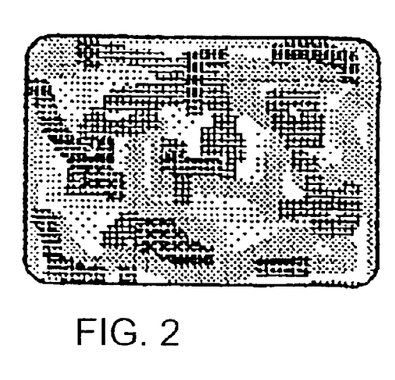
FIG. 2 illustrates a digital watermark signal.

We now describe our preferred image construction with reference to FIGS. 1–4. FIG. 1 illustrates a flow diagram depicting method steps for a first embodiment of the present invention. A digital watermark signal is provided in step 10. The watermark signal preferably includes a message component, e.g., a payload or identifier, and/or an orientation component. An orientation component is helpful to resolve image distortion such as scale and rotation. FIG. 2 illustrates an example of a watermark signal shown in a spatial domain. (We note that the FIG. 2 representation is exaggerated to help simplify the discussion.). Although not required, the digital watermark signal is preferably a pure (or "raw") signal in that it does not include image data.

Thresholding is applied to the FIG. 2 watermark signal (step 12). Thresholding preferable identifies (or reduces the watermark signal to) a set of relevant points. The relevant points may correspond to or represent a wide range of features, such as signal or frequency peak levels, magnitude peaks, watermark message components, watermark orientation references, spatial domain signal characteristics, etc. Regardless of the relevant features used to determine a relevant point, the set of relevant points is preferably sufficient to represent (or convey) the watermark signal. (We use the term "thresholding" generally herein to include a process to identify a set and location of spatial points for placement of message objects. Alternatively, the thresholding may identify relevant frequency domain points, which can be mapped or transformed into a spatial domain representation.) The thresholding procedure can also be adjusted to provide a more or less robust watermark signal. For example, the spacing of relevant points can be increased, but at a cost of robustness.

While the term "thresholding" is used as an illustrative technique, the present invention is not so limited. Indeed there are other ways to map a watermark signal into a set of relevant points. For example, a frequency analysis can be used to identify significant frequency characteristics (e.g., peaks). These characteristics can be mapped to the spatial domain to identify a placement point (e.g., a spatial location). Or, as in another implementation, the digital watermark signal is quantitized, e.g., via a root mean square measurement. Of course other techniques can be used to map a watermark signal to a set of relevant spatial points that is sufficient to convey the signal. We also note that some digital watermark signals can be convey in terms of a plurality of spatial positions and points.

Figure 3:
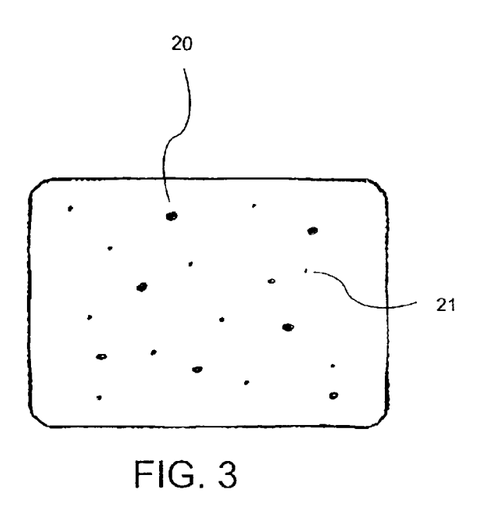
FIG. 3 illustrates a representation of the FIG. 2 watermark signal after thresholding.

The set of relevant points comprises a placement map as shown in FIG. 3. (It should be appreciated that there are many, many possible placement map patterns depending on message and orientation components, protocol, etc., including many more or less significant positions. FIG. 3 illustrates but one such possible placement map.). The FIG. 3 placement map includes a plurality of spatial positions or points (e.g., 20 and 21). These points guide the placement of (or form a template for) message objects.

In one alternative implementation, the placement map includes a relative contrast indicator. For example, a placement map point may include a relatively darker or larger point (20), indicating a need for a stronger contrast level (or color, gray-scale, etc.) of a message object, in comparison to a relatively lighter or smaller point (21). A higher contrast may signify a predetermined frequency domain characteristic, such as peak magnitude or frequency response, etc.

Returning to FIG. 1, message objects are arranged according to the placement mapping (step 14). For example, message marbles (or message stars, black Dalmatian spots, etc.) are placed on or over (or otherwise placed corresponding to) the placement map points. The message objects thus convey the steganographic signal. Other image objects can be placed in the image, e.g., to fill in or otherwise populate the image.

Figure 4:
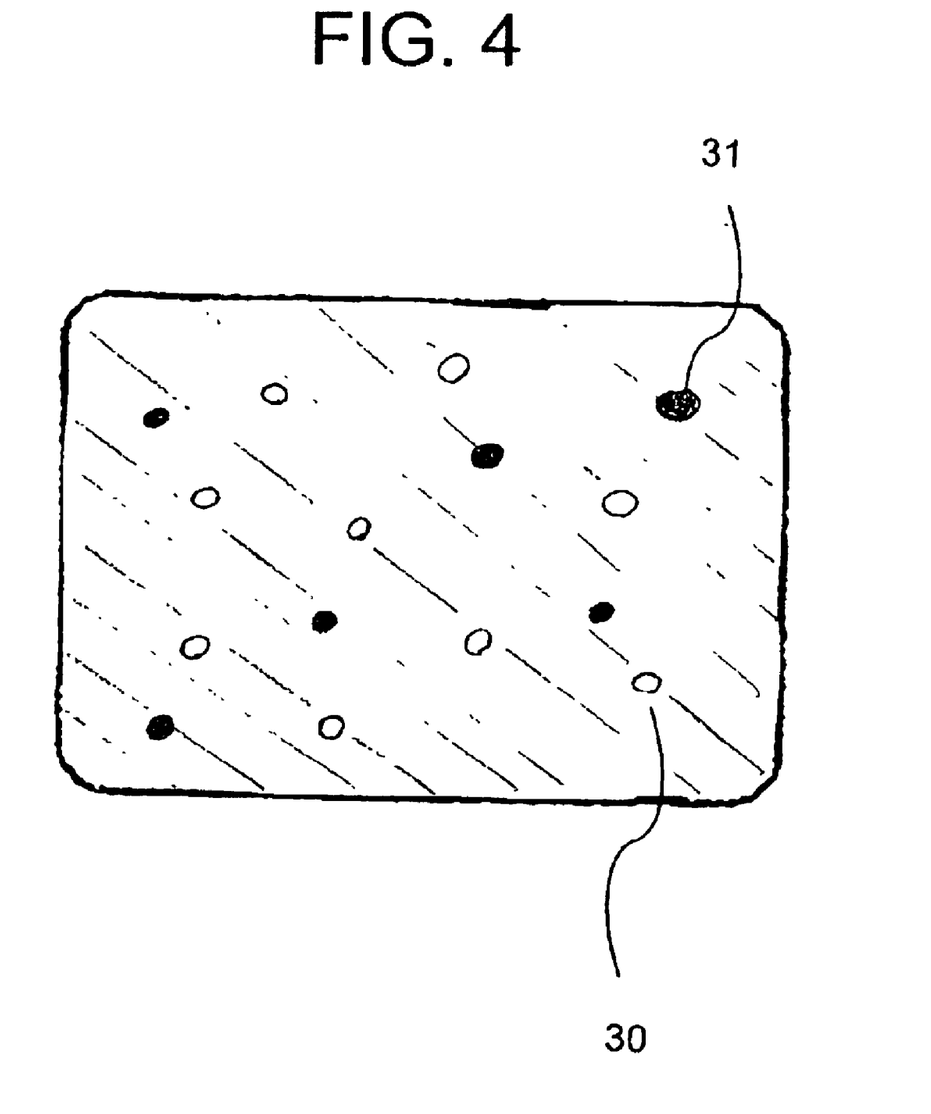
FIG. 4 illustrates a gray-scale image including message objects.

With reference to FIG. 4, message objects of different colors (or gray-levels, tones, contrasts, luminance, etc.) can be used in the same image. For example, the FIG. 4 image includes a gray background (shown by the diagonal hashes). A message object can be distinguished from the background if it is either lighter 30 or darker 31 than the background. Or if the background is blue, message objects can be red or green, etc.

Alternative Steganographic Images

There are many alternative ways to utilize our inventive steganographic techniques. Consider the following illustrative examples.

Digital Images

Off-the-shelf digital image editing tools (e.g., as provided by Adobe) can be used to place message objects in an image. The operator selects a message object, adjusts the object contrast (or color/gray-level, etc.) to sufficiently set the object apart from other image objects or the image background, and then places the objects according to a digital watermark placement map. Of course this placement process can be automated.

Marking Fields

A farmer's field can be plowed or crops can be planted or cut to represent message objects, all arranged according to a steganographic placement map. An aerial image of the farmer's field then includes the steganographic message.

Vegetation

Different color tulips (or other flowers, trees or vegetation) can be planted according to a placement map. For example, groups of white tulips (e.g., message tulips) can be planted in an otherwise purple tulip field. An aerial image captures the field—including the steganographic message conveyed through the strategic placement of the white tulips.

Marking Buildings, Airports and Roads

Figure 5A:
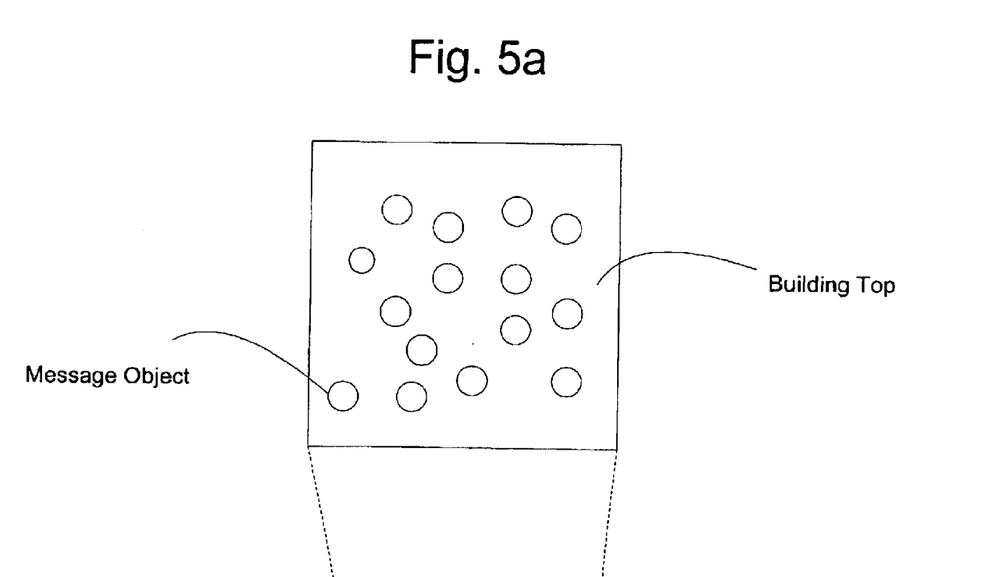
FIGS. 5a and 5b illustrate a physical structure including a signal hidden on a top-surface thereof through arrangement of message objects.
Figure 5B:
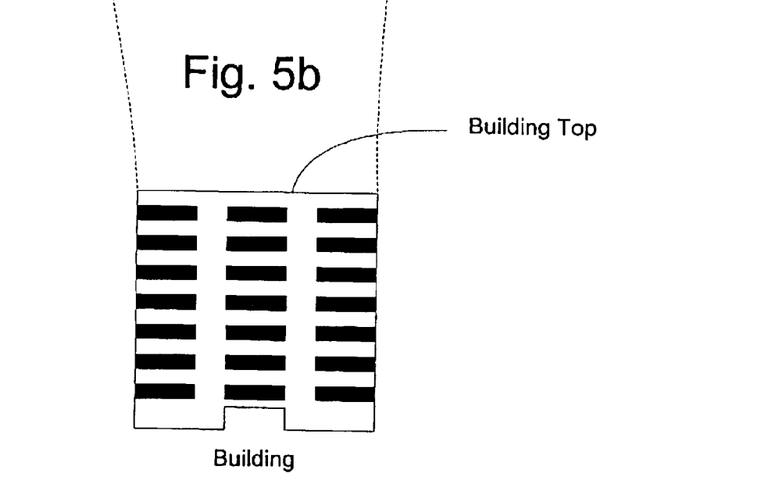

With reference to FIGS. 5a and 5b, message objects are arranged on top of (FIG. 5a) a building (FIG. 5b) to convey a steganographic signal. The signal can be detected from an aerial image of the building top (FIG. 5a), e.g., captured from an aircraft, balloon, satellite, unmanned aircraft, etc. (For example, in a case where the signal comprises a digital watermark, a digital watermark detector analyzes a captured image. The detector detects and decodes the digital watermark from the captured image.).

Figure 6:
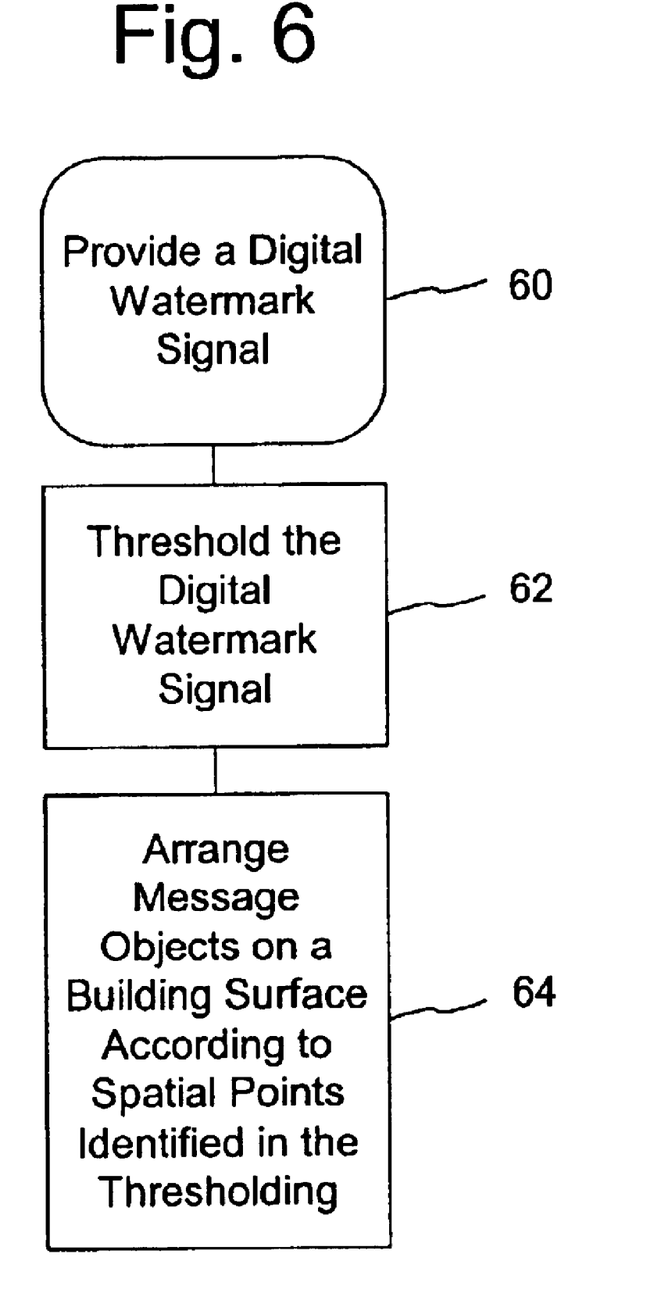
FIG. 6 illustrates a signal hiding technique with respect to FIGS. 5a and 5b.

Our building-marking process is further described with reference to FIG. 6. A steganographic signal (e.g., digital watermark signal) is provided in step 60. The signal preferably includes a message or payload. In one implementation, the message conveys the geo-location of the subject building. The geo-location can include a longitude and latitude position, a map coordinate, reference location, altitude, and/or directional indicator, etc. In another implementation, the message includes an identifier. In some cases the identifier is associated with a record maintained in a data structure. The record can include the geo-location information and/or other information such as related imagery, reports, commentary, history, etc., etc. Once decoded from the hidden signal, the identifier is used to interrogate the data structure to recover the record information. In other cases the identifier is sufficient to identify a structure without reference to the data structure.

Marking a building with a geo-location indicator includes many advantages. A captured image of an area that depicts such a marked building provides a fixed geo-reference point—provided by the hidden signal on the building. Other image locations can be determined based on a frame of reference provided by the geo-location indicator. For example, once a geo-location is know for the building, other geo-locations in the image can be interpolated. (We note that a steganographic signal or digital watermark signal may include an orientation component. An orientation component is useful in resolving issues of rotation and scale or other image distortion. Thus, precise image locations can be determined in relation to the geo-referenced building location by accounting for image rotation and scale.). The arduous process of assigning geo-coordinates to a captured image is significantly simplified with our techniques.

When analyzing the image including a marked structure, a hidden signal can be isolated to particular structure by including a signal payload field that identifies the structure's boundaries with perhaps a center point of the structure. In another implementation, the hidden signal is isolated to a particular depicted structure from the analysis of a signal detector. A signal detector sniffs (e.g., looks through) an image and determines where within the image it can detect the signal. Such analysis can be used to trace a boundary of the marked structure, since the signal is isolated within such boundaries.

Returning to FIG. 6, the signal is thresholded, or reduced to a set of minimal placement points in step 62. The set of placement points comprises a placement map. Message objects are arranged on a top-surface (FIG. 5a) of the building according to the placement map in step 64. The message objects can include air vents, painted markings, UV or IR markers, reflectors, differently colored rocks on a graveled roof, lights, distinguishable bricks or cement or other building materials, cloth, textured coverings (tar, asphalt, etc.), etc., or any other object that can be arranged to convey a hidden message. In alternative implementations, the steganographic signal is conveyed in terms of spatial location points. Message objects are arranged in conformance with the location points—without first thresholding the signal.

One application of our inventive techniques is to provide a ground reference indicator for aircraft or satellites. Consider an aircraft, which captures an image of a marked building, and then decodes the signal to recover hidden geo-location information. The geo-location information can be used to provide reliable (as well as machine-readable) ground position verification for the aircraft. The aircraft can adjust or verify its position or flight path based on such geo-location information, or verify ground coordinates based upon such geo-location information.

While the above example has focused on buildings, this aspect of the present invention is not so limited. Indeed, bridges, houses, docks, warehouses, streets, parking lots, roads, buildings, water or fuel tanks, hospitals, power utilities, dams, etc. can be similarly marked—such structures are referred to as "physical structures." In one implementation, we arrange naturally occurring objects, e.g., rocks, plants, etc., to mark an otherwise barren or rural area. Also, for some implementations, the marking need not be on top of a structure. Instead, the marking can be on a side of a structure, particularly when aerial imagery is captured from an angle.

Photo-mosaics

Our techniques can even be advantageously employed in the photo-mosaic field. (Photo-mosaic processes are even further discussed, e.g., in U.S. Pat. Nos. 6,137,498 and 5,649,032, which are each incorporated herein by reference.). As disclosed in U.S. Pat. No. 6,137,498, a mosaic image is formed from a database (or collection) of source images. Source images are analyzed, selected and organized to produce the mosaic image. A target image is divided into tile regions, each of which is compared with individual source image portions to determine the best available matching source image. Positioning respective best-matching source images at the respective tile regions forms the mosaic image.

An improvement to a photo-mosaic process is to arrange message source photos (e.g., representing message objects) according to a steganographic placement map. Preferably, the message source photos are subtly distinguishable from other mosaic photos via a gray-scale value, a color value, contrast or luminance, etc. The message source photos form (or convey) a steganographic signal. In one implementation, the arrangement of message source photos is carried out via the "best available matching" discussed above with respect to the U.S. Pat. No. 6,137,498. In a first implementation, the process determines whether a selected best available photo is to be titled over a placement map position. If so, the photo characteristics (luminance, contrast, gray-scale, etc.) are subtly altered to create a message source photo. In a second implementation, the "best available matching" algorithm includes selection criteria, e.g., if selecting a photo for a placement map position, the algorithm selects a photo with sufficient distinguishing characteristics to qualify as a message object. The distinguishing characteristics can be measured in terms of its neighbors (e.g., a message photograph may include an overall different contrast, color or gray-scale level from its neighboring photographs) or in terms of non-message photographs. In a third implementation, message source photos are arranged according to a placement map, and then other source photos are used to fill in or complete the photo mosaic. In a variation of this third implementation, the other, non-message source photos are selected and arranged according to a best available matching technique.

Other Alternatives

Similar embedded designs can be made using coins, bills, umbrellas, coffee mugs, opened or closed blinds in a building, window tints, shapes, snow flakes, groups of pixels, etc., etc.

Advertisements

Captured images including our steganographic signal arranged with message objects can be used in advertisements, e.g., when the steganographic signal includes a message link (e.g., a URL or an identifier used to obtain a link). Assignee's U.S. patent application Ser. No. 09/571,422, filed May 15, 2000, discloses many suitable linking techniques that are contemplated as being combined with the present invention. The U.S. patent application No. 09/571,422 is herein incorporated by reference Message Detection An steganographic signal created according to our inventive techniques can be read using steganographic or digital watermarking decoding techniques, e.g., as described in assignee's U.S. patent application Ser. Nos. 09/571,422 and/or 09/503,881. In one implementation, Digimarc MediaBridge watermark reading software, available from Digimarc Corporation headquartered in Tualatin, Oreg., is used to read an image including a corresponding MediaBridge digital watermark signal represented through our message object arranging techniques. Of course, other decoding techniques can be used, particularly when they correspond to the techniques used to generate the original watermark signal. (For example, when using a Digimarc MediaBridge reader, the watermark signal is preferably created using a MediaBridge signal generator or embedder.). Most commonly, the reader identifies the message objects from the different levels of contrast (or color, gray-scale, luminance, etc.) between a message object and other objects or background.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are contemplated. For example, while we have focused on providing hidden signals via object arrangement, the present invention is not so limited. Indeed, we envision that other digital watermarking techniques could be used to mark images or designs that are placed on physical structures.

One application uses our inventive embedding techniques for "long-distance" or aerial digital watermark reading, e.g., for some of the traffic monitoring examples disclosed in Assignee's U.S. Provisional Patent Application No. 60/327,687, filed Oct. 5, 2001. (In one experiment we created a digitally watermarked image using our inventive object placement techniques disclosed herein. We then optically captured an image of the watermarked image with a digital camera augmented with a telescope. The watermarked image was about 100 feet away from the camera/telescope. The watermark was successfully detected.).

In one alternative implementation of the present invention, we use our techniques to provide a "zero-emission" communications signal. In other words, our above-described techniques make it almost impossible for an "eaves-dropper" to intercept our message. We arrange message objects on a top surface of structure to convey a message. An aerial platform collects imagery including our message. The imagery is routed to the intended recipient, who decodes the image to retrieve our message. In some case we arrange a set of message objects on a structure to convey a signal orientation component. (The orientation component assists in resolving issues such as image rotation and scale, etc.). We can then change only select objects of another set of message objects—objects that convey the message—to update or alter the message.

Although not belabored herein, artisans will understand that the systems and methods described above can be implemented using a variety of hardware and software systems. Alternatively, dedicated hardware, or programmable logic circuits, can be employed for such operations.

The various section headings in this application are provided for the reader's convenience and provide no substantive limitations. The features found in one section may be readily combined with those features in another section.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of marking a physical structure comprising the steps of:
   providing a steganographic signal;
   identifying a set of spatial position points corresponding to the steganographic signal; and
   arranging message objects on a surface of the physical structure to be viewable from an aerial platform, wherein the arrangement is in accordance with the spatial position points.

2. The method according to claim 1, wherein the physical structure comprises at least one of a bridge, house, dock, airport, runway, warehouse, street, parking lot, road, building, water or fuel tank, hospital, power utility, and dam.

3. The method of claim 2, wherein the message objects comprise at least one of painted objects, painted areas including ultra-violet light fluorescing properties, painted areas including infrared light fluorescing properties, air vents, paint, cloth, physical surface texture, physical objects and lights.

4. The method claim 1 wherein the steganographic signal comprises a digital watermark signal including an indicator.

5. The method of claim 4, wherein the indicator comprises geo-location information.

6. The method of claim 4, further comprising the step of interrogating a database with the indicator to retrieve related information.

7. The method of claim 1, wherein the set of spatial position points comprises a sufficient number of points to allow detection of the steganographic signal.

8. A method of providing a geo-location reference for a physical structure comprising the steps of steganographically providing machine-readable code on a top surface of the physical structure that is detectable from an aerial platform, wherein placement of the machine-readable code on the top surface of the physical structure does not betray the existence of the code to human observers of the top surface of the physical structure, but the code is detectable from image data corresponding to the top surface of the physical structure, wherein the machine readable code comprises a geo-location reference.

9. The method of claim 8, wherein the machine-readable code comprises a digital watermark component.

10. The method of claim 9, wherein the digital watermark component comprises a set of points spatially arranged to convey the geo-location reference.

11. The method of claim 10, wherein message objects are arranged on the physical structure to represent the set of points.

12. The method of claim 8, wherein the geo-location reference serves as a link to related information.

13. A method to determine geo-locations depicted in an image captured from an aerial platform, said method comprising the steps of:
   analyzing the image to detect a signal steganographically hidden on an outer surface of a first physical structure that is depicted in the image, wherein the signal comprises a message including a geo-location indicator; and
   based on the geo-location indicator determining a geo-location for the first physical structure.

14. The method of claim 13, wherein the signal comprises an orientation component indicating at least rotation and scale, said method further comprising the step of determining a geo-location for an area or a second physical structure depicted in the image by interpolating a distance from the geo-location of the first physical structure to the area or second physical structure taking into account the rotation and scale as evidenced by the orientation component.

15. The method of claim 13, wherein the signal is steganographically hidden on the outer surface of the first physical structure according to at least the following steps:
   providing a steganographic signal;
   identifying a set of spatial position points corresponding to the steganographic signal; and
   arranging message objects in accordance with the spatial position points.

16. A method of determining a geo-location of a ground area or physical structure from an aerial platform comprising the steps of:
   capturing an image of the ground area or physical structure, wherein the ground area or physical structure comprises a signal steganographically provided on an surface of the physical structure so as to be capable of being captured in an image taken from the aerial platform, and wherein the signal comprises a geo-location indicator;
   decoding the signal to obtain the geo-location indicator; and
   based on the geo-location indicator determining a location for the ground area or physical structure.

17. The method of claim 16, wherein the signal is convey through a set of message objects arranged in accordance with a digital watermark signal.

18. The method of claim 16, wherein said determining step comprises interrogating a data structure with the geo-location indicator to obtain geo-location information pertaining to the ground area or physical structure.

* * * * *

UNITED STATES PATENT AND TRADEMARK OFFICE
CERTIFICATE OF CORRECTION

| | | |
|---|---|---|
| PATENT NO. | : 6,993,152 B2 | Page 1 of 3 |
| APPLICATION NO. | : 10/218021 | |
| DATED | : January 31, 2006 | |
| INVENTOR(S) | : Philip R. Patterson et al. | |

It is certified that error appears in the above-identified patent and that said Letters Patent is hereby corrected as shown below:

ON THE COVER OF THE PATENT

Item 63, under "Related U.S. Application Data", delete lines 1-15 and replace with the following paragraph:

Related U.S. Application Data

(63) --Continuation-in-part of application No. 10/074,680, filed on Feb. 11, 2002. Present application is also a continuation-in-part of application No. 09/939,298, filed on Aug. 24, 2001, now Pat. No. 6,804,379, which is a continuation-in-part of application No. 09/127,502, filed Jul. 31, 1998, now Pat. No. 6,345,104, which is a continuation-in-part of application No. 09/074,034, filed May 6, 1998, now Pat. No. 6,449,377. The application No. 09/127,502 is also a continuation-in-part of application No. 08/967,693, filed Nov. 12, 1997, now Pat. No. 6,122,392, which is a continuation of application No. 08/614,521, filed Mar. 15, 1996, now Pat. No. 5,745,604, which is a continuation of application No. 08/215,289, filed Mar. 17, 1994, now abandoned. Application No. 09/127,502 is also a continuation-in-part of application No. 08/649,419, filed May 16, 1996, now Pat. No. 5,862,260.--.

IN THE SPECIFICATION
Please make the following corrections:

Column 1, line 7
Delete "Feb. 11, 2002." and replace with --Feb. 11, 2002 (published as US 2002-0136429 A1).--.

Column 1, line 28
Delete "titled crata Hiding" and replace with --titled Data Hiding--.

Signed and Sealed this
Twenty-third Day of August, 2011

David J. Kappos
*Director of the United States Patent and Trademark Office*

Column 1, line 31

Delete "filed August 27, 2001, and" and replace with --filed August 27, 2001 (published as US 2003-0039376 A1), and--.

Column 2, line 3

Delete "Ser. No. 09/503,881" and replace with --Ser. No. 09/503,881 (now U.S. Patent No. 6,614,914)--.

Column 2, lines 3-4

Delete "U.S. patent application Ser. No. 6,122,403," and replace with --U.S. Patent No. 6,122,403--.

Column 2, line 5

Delete "Ser. No. 09/127,502" and replace with --Ser. No. 09/127,502 (now U.S. Patent No. 6,345,104)--.

Column 2, line 45

Delete "of a computer a workstation" and replace with --of a computer workstation--.

Column 3, line 6

Delete "characteristics many include, color" and replace with --characteristics may include color--.

Column 3, line 12

Delete "message objects may" and replace with --message object may--.

Column 5, line 4

Delete "Thresholding preferable identifies" and replace with --Thresholding preferably identifies--.

Column 5, line 31

Delete "can be convey in terms" and replace with --can be conveyed in terms--.

Column 6, line 53

Delete "geo-location is know for" and replace with --geo-location is known for--.

Column 6, line 63

Delete "isolated to particular" and replace with --isolated to a particular--.

Column 8, line 29

Delete "An steganographic" and replace with --A steganographic--.

Column 9, line 18

Delete "case we arrange" and replace with --cases we arrange--.

IN THE CLAIMS

Please make the following corrections:

Column 9, line 41, Claim 1

Delete the words "the steps of".

Column 9, line 45, Claim 1

Delete the word "message".

Column 9, line 53, Claim 3

Delete the word "message".

Column 9, line 59, Claim 4

Insert the word --of-- between the words "method" and "claim".

Column 9, line 62, Claim 6

Delete the words "the step of".

Column 10, line 2, Claim 8

Delete the words "the steps of".

Column 10, line 22, Claim 13

Delete the words "the steps of".

Column 10, line 32, Claim 14

Delete the words "the step of".

Column 10, line 40, Claim 15

Delete the word "steps".

Column 10, line 44, Claim 15

Delete the word "message".

Column 10, line 48, Claim 16

Delete the words "the steps of".

Column 10, line 51, Claim 16

Delete the word "an" and replace with the word --a--.

Column 10, line 59, Claim 17

Delete the word "convey" and replace with the word --conveyed--.

Column 10, line 63, Claim 18

Delete the word "step".